United States Patent
Chang et al.

(10) Patent No.: US 7,325,963 B2
(45) Date of Patent: Feb. 5, 2008

(54) LIQUID CRYSTAL DISPLAY AND BACKLIGHT SYSTEM WITH PARTIALLY DETACHABLE LIGHT-SOURCE COVER

(75) Inventors: Cheng Fan Chang, Miao-Li (TW); Ching-Tung Hsieh, Miao-Li (TW)

(73) Assignee: Innolux Display Corp., Chu-Nan, Miao-Li County (TW)

( * ) Notice: Subject to any disclaimer, the term of this patent is extended or adjusted under 35 U.S.C. 154(b) by 81 days.

(21) Appl. No.: 11/319,901

(22) Filed: Dec. 28, 2005

(65) Prior Publication Data

US 2006/0139963 A1  Jun. 29, 2006

(30) Foreign Application Priority Data

Dec. 28, 2004  (TW)  .................................. 93221033

(51) Int. Cl.
*F21V 7/04* (2006.01)

(52) U.S. Cl. .................... 362/633; 362/634; 349/60

(58) Field of Classification Search ............. 349/58, 349/60; 362/600, 615, 632–634
See application file for complete search history.

(56) References Cited

U.S. PATENT DOCUMENTS

| 5,537,296 A | * | 7/1996 | Kimura et al. ............... 362/634 |
| 6,243,068 B1 | * | 6/2001 | Evanicky et al. ............ 345/102 |
| 7,004,614 B2 | * | 2/2006 | Tsai et al. ................... 362/633 |

* cited by examiner

*Primary Examiner*—Sandra O'Shea
*Assistant Examiner*—Jason Moon Han
(74) *Attorney, Agent, or Firm*—Wei Te Chung

(57) ABSTRACT

An exemplary liquid crystal display includes an LCD panel (22); a light guide plate (234), a light source (231) disposed at a side of the light guide plate; a light-source cover (232) surrounding part of and holding the light source, the light-source cover defining a groove at one end thereof; and a frame (237) receiving the light guide plate, the light source and the light-source cover, the frame including an opening (2377), a side wall (2374) and an elastic protrusion (2371) formed on the sidewall (2374) near the opening. A main portion of the light-source cover is received in the frame through the opening of the frame and the light-source cover is attached to the frame by engagement of the elastic protrusion.

8 Claims, 6 Drawing Sheets

LIQUID CRYSTAL DISPLAY AND BACKLIGHT SYSTEM WITH PARTIALLY DETACHABLE LIGHT-SOURCE COVER

BACKGROUND OF THE INVENTION

1. Field of the Invention

The present invention relates to a backlight system used in a liquid crystal display (LCD), and particularly to a liquid crystal display and a backlight system used therein having uniform luminance.

2. General Background

In general, LCDs have two main advantages in comparison with cathode ray tubes (CRTs): LCDs are thin, and have low power consumption. It has been said that LCDs might one day completely replace CRT display devices, and LCDs have aroused great interest in many industries in recent times. In general, an LCD needs a surface light source to provide even light for a clear display.

A typical surface light source comprises a light source and a light guide plate. The light source may be a linear light source, or one or more point light sources. The light guide plate has an end face through which light is introduced, and two opposite major faces one of which functions as a light emission face. The performance of the surface light source greatly depends on the characteristics of the light guide plate employed therein.

The light guide plate functions to change a direction of propagation of light beams emitted from the light source and introduced into the light guide plate, from a direction roughly parallel to the emission face of the light guide plate to a direction perpendicular to the emission face. That is, the light guide plate effectively changes the linear or point light source(s) into a surface light source, for evenly illuminating a whole display screen of the LCD. The light guide plate often further comprises a plurality of scattering dots disposed on the bottom surface, for eliminating total internal reflection of light beams in the light guide plate. That is, the scattering dots diffuse the light beams, thereby improving the uniformity of brightness of the light guide plate and enhancing the optical characteristics of the LCD. Different LCDs require scattering dots having different shapes, sizes, and distribution densities depending on the different uses to which the LCDs are put.

FIG. 7 shows a conventional LCD 1, which comprises a top frame 11, an LCD panel 12, a surface light source 13, and a bottom frame 14. The LCD panel 12 and the backlight system 13 are accommodated a the space cooperatively defined by the top frame 11 and the bottom frame 14. The backlight system 13 is disposed under the LCD panel 12 for providing the light beams to the LCD panel 12. The backlight system 13 comprises a light guide plate 133, a reflector 134, a diffuser 135, a brightness enhancement film (BEF) 136, a linear light source 131, and a lamp cover 132 covering three sides of the linear light source 131. The BEF 136, the diffuser 135, the light guide plate 133 and the reflector 134 are stacked one on the other in that order from top to bottom. The linear light source 131 is disposed adjacent to one side of the light guide plate 133.

In assembly of the LCD 1, a relatively complicated working process is required. In addition, if the lamp 131 needs to be exchanged, the reflector 134 and the frames 11, 14 must all be detached. These disadvantages are unduly laborious and time-consuming.

What is needed, therefore, is a simple, compact LCD with a backlight system, which is easy to assemble and which allows easy exchange of a built-in light source.

SUMMARY

A backlight system of one embodiment of the present invention comprises: a light guide plate; a light source disposed at a side of the light guide plate; a light-source cover surrounding part of and holding the light source, the light-source cover defining a groove at one end thereof; and a frame receiving the light guide plate, the light source and the light-source cover, the frame including an opening, a side wall and an elastic protrusion formed on the sidewall near the opening. A main portion of the light-source cover is received in the frame through the opening of the frame and the light-source cover is attached to the frame by engagement of the elastic protrusion.

A liquid crystal display of another embodiment of the present invention comprises: an LCD panel; a light guide plate; a light source disposed at a side of the light guide plate; a light-source cover surrounding part of and holding the light source, the light-source cover defining a groove at one end thereof; and a first frame receiving the LCD panel, the light guide plate, the light source and the light-source cover, the frame including an opening, a side wall and an elastic protrusion formed on the sidewall near the opening. A main portion of the light-source cover is received in the frame through the opening of the frame and the light-source cover is attached to the frame by engagement of the elastic protrusion.

Other advantages and novel features will become more apparent from the following detailed description when taken in conjunction with the accompanying drawings, in which:

DETAILED DESCRIPTION OF THE PREFERRED EMBODIMENTS

Hereinafter, preferred embodiments of the present invention will be explained in detail with reference to the accompanying drawings.

Figure 1:
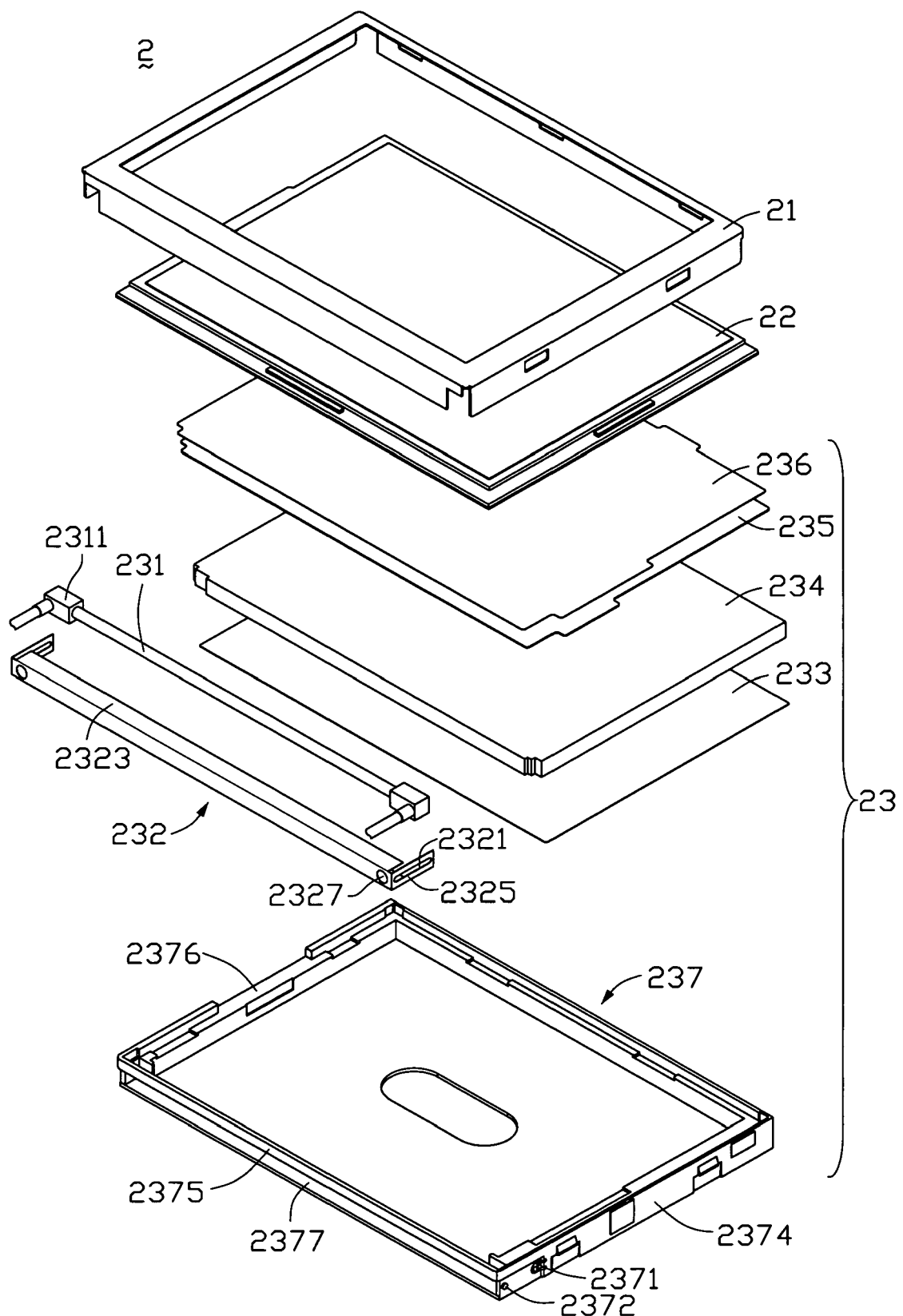
FIG. 1 is an exploded, isometric view of an LCD in accordance with an exemplary embodiment of the present invention.
Figure 2:
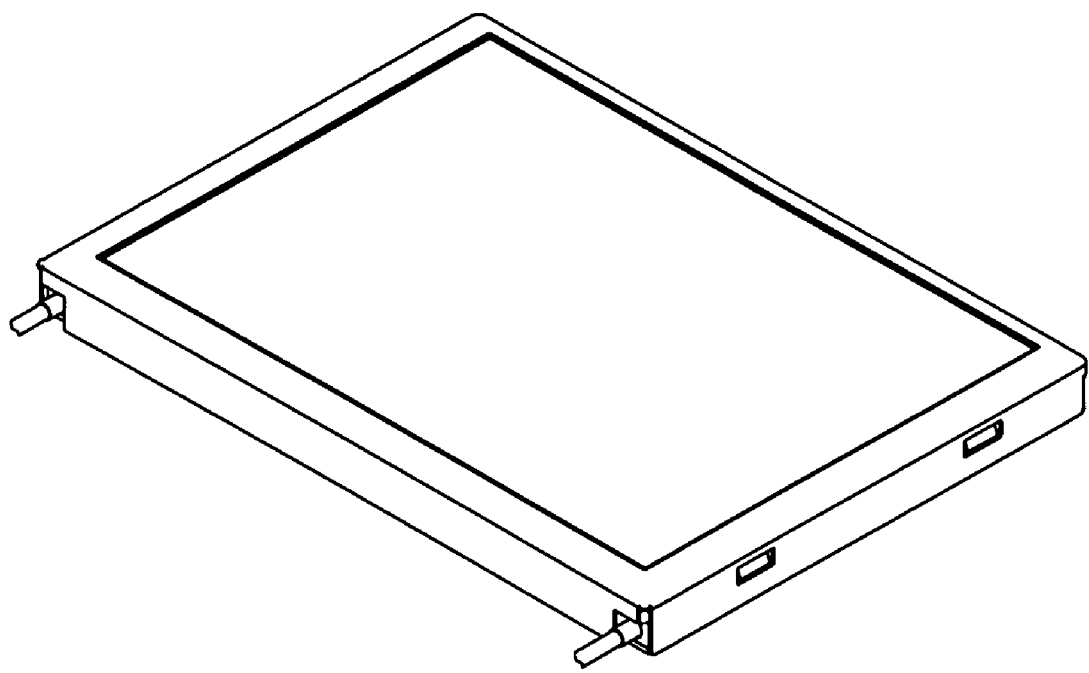
FIG. 2 is an assembled view of the LCD of FIG. 1.
Figure 3:
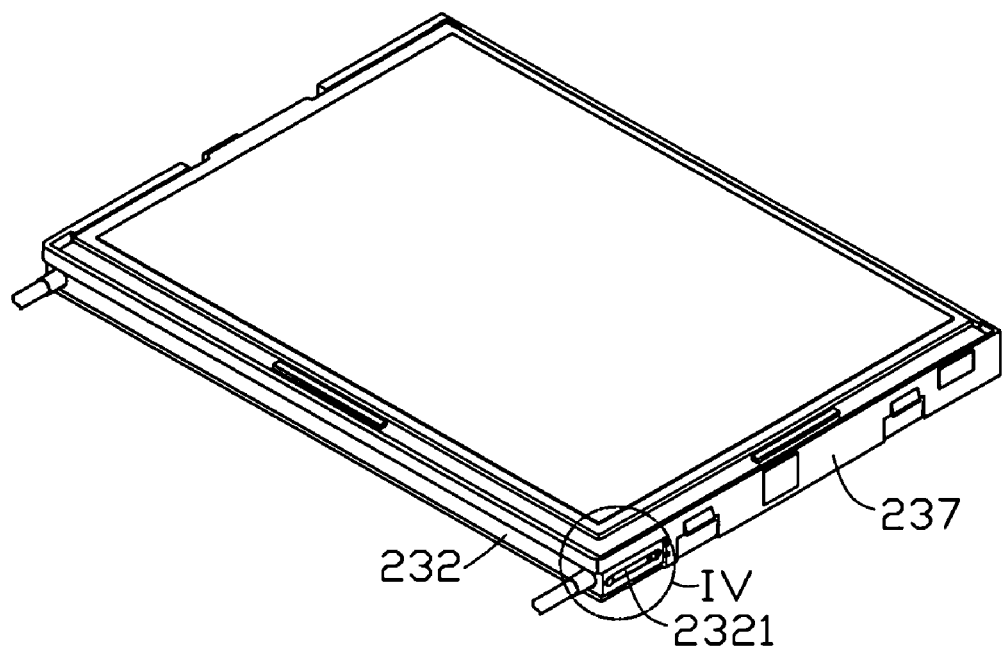
FIG. 3 is similar to FIG. 1, but showing the LCD after a top frame thereof has been removed.
Figure 4:
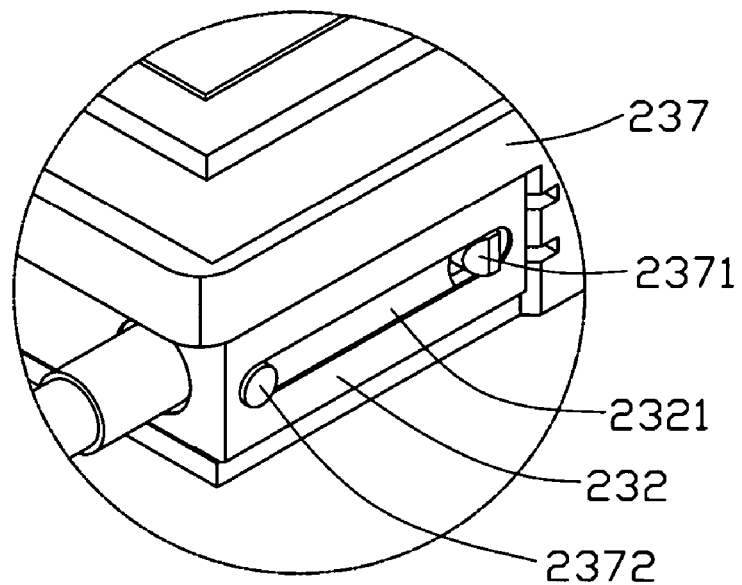
FIG. 4 is an enlarged view of a circled portion IV of FIG. 3.

As shown in FIG. 1, an LCD 2 in accordance with an exemplary embodiment of the present invention comprises a top frame 21, an LCD panel 22, a backlight system 23, and a bottom frame 237. The top frame 21 and the bottom frame 237 cooperate to accommodate the LCD panel 22 and the backlight system 23 therebetween. The backlight system 23 is disposed under and parallel with the LCD panel 22, to provide the light beams to illuminate the LCD panel 22.

The backlight system 23 comprises a BEF 236, a diffuser 235, a light guide plate 234, a reflection sheet 233, a light source 231, and a light-source cover 232. The BEF 236, the diffuser 235, the light guide plate 234, and the reflection sheet 233 are stacked one on the other in that order from top to bottom. The light source 231 is disposed adjacent to a side surface of the light guide plate 234, to provide light beams to the light guide plate 234. The light-source cover 232 covers three sides of the light source 231, for reflecting light beams received from the light source 231 toward the light guide plate 234.

A cold cathode fluorescent lamp (CCFL) may be used as the light source 231. Both ends of the light source 231 are respectively protected by two resinous protection members 2311. Two lead wires (not labeled, only partly shown) for supplying electric power to the light source 231 are disposed at the two ends of the light source 231, respectively.

The light-source cover 232 is formed by molding resinous material of high reflectivity. The light-source cover 232 comprises an elongate light source holding member 2323, and two arms 2325 extending from two opposite ends of the light source holding member 2323 respectively. The light source holding member 2323 has a generally U-shaped cross-section, and defines an elongate opening at a side thereof nearest the light guide plate 234. The light source holding member 2323 is sized to fittingly receive the resinous protection members 2311 of the light source 231 therein. Two lead wire holes 2327 are defined in two opposite ends respectively of an elongate panel of the light source holding member 2323 which is farthest from the light guide plate 234. The lead wire holes 2327 fittingly receive the respective lead wires therethrough. Each arm 2325 defines an elongate slide groove 2321 in a middle region thereof.

The bottom frame 237 has a first side wall 2374, a second side wall 2376 opposite to the first side wall 2374, and a third side wall 2375 interconnecting the first side wall 2374 and the second side wall 2376. The third side wall 2375 defines an elongate opening 2377 along an entire length thereof. An elastic protrusion 2371 and a stopper 2372 are provided at an end of the first side wall 2374 that is adjacent to the opening 2377. The stopper 2372 is disposed nearer to the opening 2377 than the elastic protrusion 2371. A distance between the elastic protrusion 2371 and the stopper 2372 is slightly less than a length of a corresponding slide groove 2321 of the light-source cover 232. The elastic protrusion 2371 is formed integrally with a main portion of the first side wall 2374, with a U-shaped notch (not labeled) being defined around three sides of the elastic protrusion 2371. With this configuration, the elastic protrusion 2371 can be elastically pressed inwardly. Similar to the above-described elastic protrusion 2371 and stopper 2372, another elastic protrusion 2371 and another stopper 2372 are provided at an end of the second side wall 2376 that is adjacent to the opening 2377.

In assembly, the BEF 236, the diffuser 235, the light guide plate 234 and the reflection sheet 233 are sequentially accommodated in the bottom frame 237. The light-source cover 232 holding the light source 231 is slid into the bottom frame 237 through the opening 2377 of the third side wall 2375. The two arms 2325 of the light-source cover 232 are slid along the first side wall 2374 and the second side wall 2376 respectively, until the stoppers 2372 and ends of the elastic protrusions 2371 are engagingly received in respective opposite ends of the respective slide grooves 2321 of the arms 2325. Thereby, the light source cover 232 with the light source 231 is fixed to the bottom frame 237. Finally, the top frame 21 is fixed on the bottom frame 237, whereby the above-described elements accommodated in the bottom frame 237 are fixed in the bottom frame 237.

Figure 5:
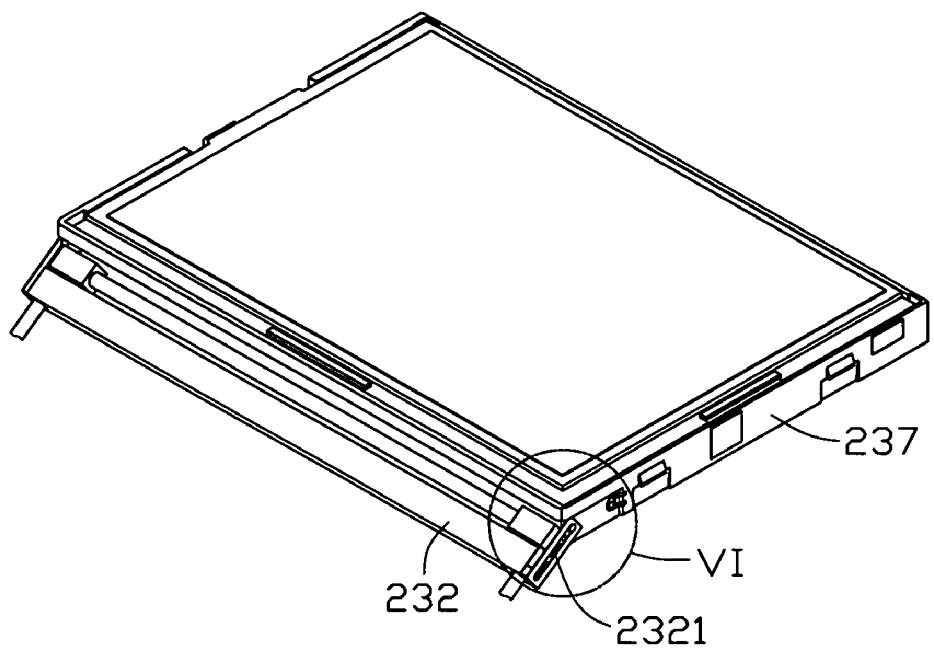
FIG. 5 is similar to FIG. 3, but showing one stage in a process of exchanging a light source of the LCD.
Figure 6:
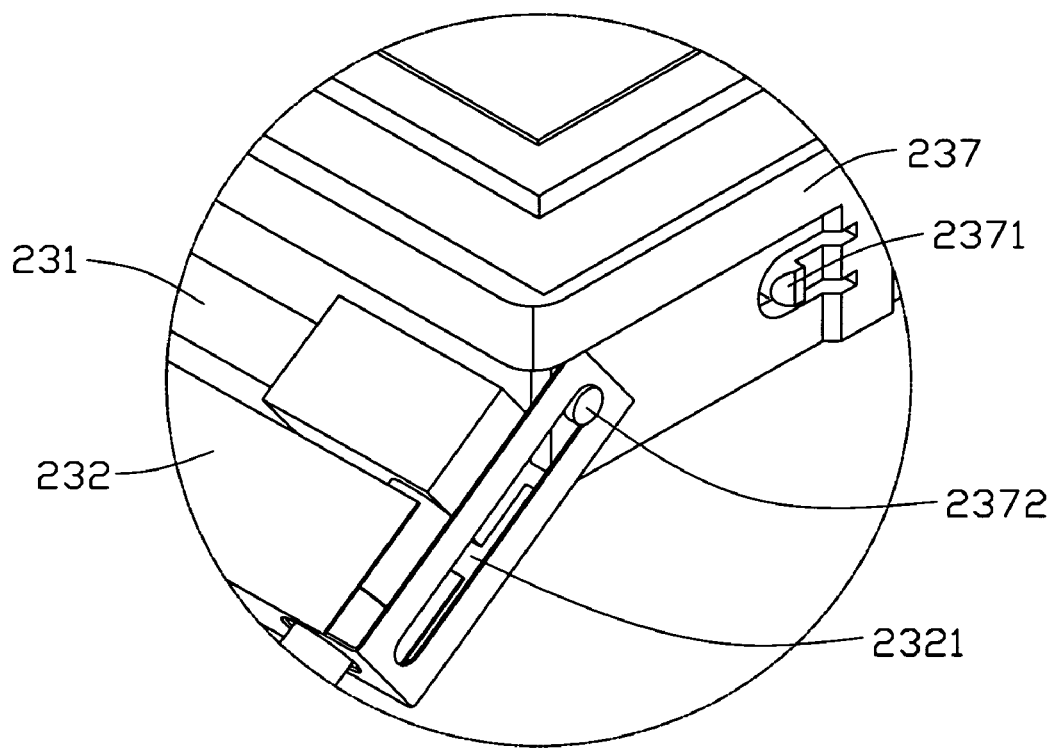
FIG. 6 is an enlarged view of a circled portion VI of FIG. 5.
Figure 7:
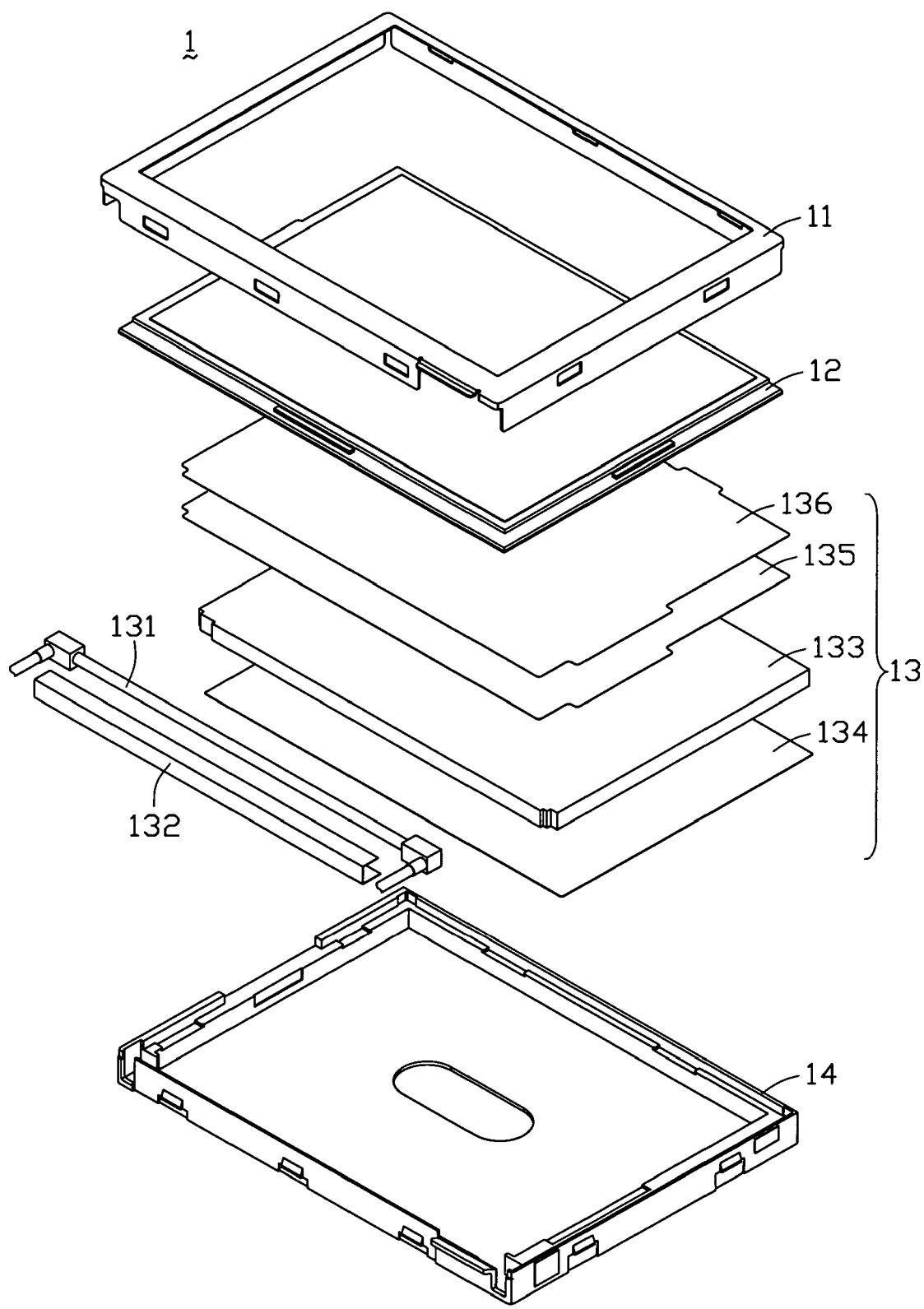
FIG. 7 is an exploded, isometric view of a conventional LCD.
Figure 8:
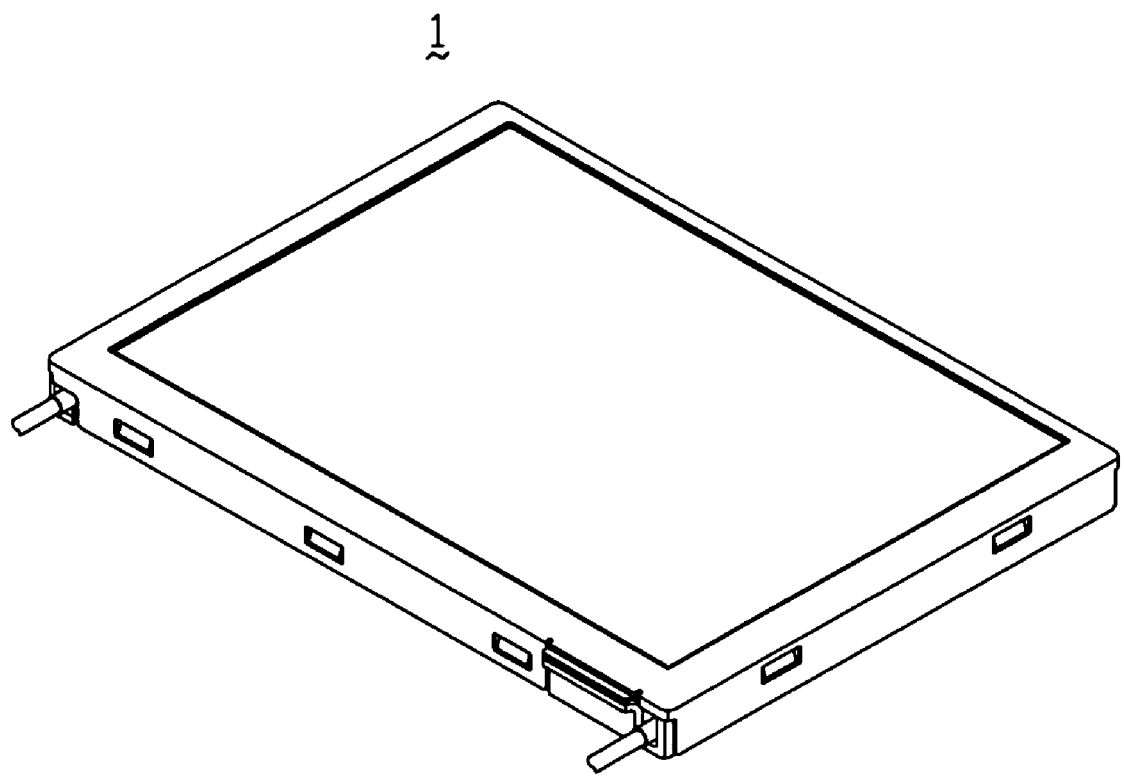
FIG. 8 is an assembled view of the LCD of FIG. 7.

In the LCD 2 having the above-described construction, to exchange the light source 231, the top frame 21 is detached from the bottom frame 237. The light-source cover 232 is then partially detached from the bottom frame 237, as shown in FIGS. 5 and 6. Since the slide grooves 2321 and the elastic protrusions 2371 are provided, the light-source cover 232 holding the light source 231 can be easily slid out from the bottom frame 237 when the elastic protrusions 2371 are pressed inward. In addition, once the light source cover 232 has been slid out to the end of its travel, the light source cover 232 can be pivoted up or down about the stoppers 2372. This enables the light source 231 to be easily accessed for exchange. In summary, in the LCD 2 provides easy assembly of the backlight system 23 therein, and easy exchange of the light source 231 thereof.

It is to be understood, however, that even though numerous characteristics and advantages of exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A backlight system comprising;
   a light guide plate;
   a light-source disposed at a side of the light guide plate;
   a light-source cover surrounding part of and holding the light source, the light-source cover defining a groove at one end thereof, the groove being a slide groove; and
   a frame receiving the tight guide plate, the light source and the light-source cover, the frame including an opening, a sidewall an elastic protrusion formed on the sidewall near the opening, a stopper adjacent to the opening, the plastic protrusion and the stopper being engaged in opposite ends of the slide groove, and a distance between the stopper and the elastic protrusion being slightly less than a length of the slide groove;
   wherein a main portion of the light-source cover is received in the frame through the opening of the frame, and the light-source cover is attached to the frame by engagement of the elastic protrusion in the groove, when the elastic protrusion is disengaged from the end of the slide groove, the light-source cover can rotate about the stopper.

2. The backlight system of claim 1, wherein the stopper is nearer to the opening of the frame than the elastic protrusion.

3. The backlight system of claim 1, further comprising a brightness enhancement film and a diffuser stacked on the light guide plate.

4. The backlight system of claim 1, further comprising a reflection sheet disposed under the light guide plate.

5. A liquid crystal display (LCD) comprising:
   an LCD panel;
   a light guide plate;
   a light source disposed at a side of the light guide plate;
   a light-source cover surrounding part of and holding the light source, the light-source cover defining a groove at one end thereof, the groove being a slide groove; and
   a frame receiving the light guide plate, the light source and the light-source cover, the frame including an opening, a sidewall, an elastic protrusion formed on the sidewall near the opening, a stopper adjacent to the opening, the elastic protrusion and the stopper being engaged in opposite ends of the slide groove, and a distance between the stopper and the elastic protrusion being slightly less than a length of the slide groove;

wherein a main portion of the light-source cover is received in the frame through the opening of the frame, and the light-source cover is attached to the frame by engagement of the elastic protrusion in the groove, when the elastic protrusion is disengaged from the end of the groove, the light-source cover can rotate about the stopper.

6. The liquid crystal display of claim 5, further comprising a brightness enhancement film and a diffuser stacked on the light guide plate.

7. The liquid crystal display of claim 5, further comprising a reflection sheet disposed under the light guide plate.

8. The liquid crystal display of claim 5, further comprising a second frame cooperating with the first frame to fix the panel, the light guide plate, the light source and the light-source cover together.

* * * * *